United States Patent [19]

Bayer et al.

[11] Patent Number: 5,382,795
[45] Date of Patent: Jan. 17, 1995

[54] ULTRAFINE SILICON TIPS FOR AFM/STM PROFILOMETRY

[75] Inventors: Thomas Bayer, Sindelfingen; Johann Greschner, Pliezhausen, both of Germany; Yves Martin, Briarcliff Manor, N.Y.; Helga Weiss, Boeblingen, Germany; Hemantha K. Wickramasinghe, Chappaqua, N.Y.; Olaf Wolter, Aidlingen, Germany

[73] Assignee: International Business Machines Corporation, Armonk, N.Y.

[21] Appl. No.: 209,682

[22] Filed: Mar. 10, 1994

Related U.S. Application Data

[60] Continuation of Ser. No. 72,898, Jun. 7, 1993, abandoned, which is a division of Ser. No. 568,451, Aug. 16, 1990, Pat. No. 5,242,541.

[30] Foreign Application Priority Data

Aug. 16, 1989 [DE] Germany .................. 89115097

[51] Int. Cl.6 .................................................. G01B 7/34
[52] U.S. Cl. ........................................ 250/306; 73/105
[58] Field of Search ................... 250/306, 307; 73/105

[56] References Cited

U.S. PATENT DOCUMENTS

| | | | |
|---|---|---|---|
| 4,968,585 | 11/1990 | Albrecht et al. | 369/170 |
| 5,116,462 | 5/1992 | Bartha et al. | 156/643 |
| 5,171,992 | 12/1992 | Clabes et al. | 250/306 |
| 5,201,992 | 4/1993 | Marcus et al. | 156/643 |
| 5,204,581 | 4/1993 | Andreadakis et al. | 313/336 |
| 5,239,863 | 8/1993 | Kado et al. | 73/105 |
| 5,242,541 | 9/1993 | Bayer et al. | 156/653 |
| 5,283,442 | 2/1994 | Martin et al. | 250/307 |
| 5,298,975 | 3/1994 | Khoury et al. | 250/306 |

FOREIGN PATENT DOCUMENTS 413040A 2/1991 European Pat. Off. .
413041A 2/1991 European Pat. Off. .

OTHER PUBLICATIONS

"Microprobe—Based CD Measurement Tool", IBM Technical Disclosure Bulletin, vol. 32, No. 7, Dec. 1989, p. 168.

Primary Examiner—Jack I. Berman
Assistant Examiner—James Beyer
Attorney, Agent, or Firm—Robert M. Trepp; Ronald L. Drumheller

[57] ABSTRACT

An ultrafine tip for AFM and STM profilometry of trenches having sidewalls. The tip includes a lateral circumferential edge protrusion to allow profilometry of the sidewalls of a trench located in a semiconductor or insulator substrate.

13 Claims, 3 Drawing Sheets

ULTRAFINE SILICON TIPS FOR AFM/STM PROFILOMETRY

This is a continuation of application Ser. No. 08/072,898, filed Jun. 7, 1993, now abandoned. 08/072,898 is a division of application Ser. No. 07/568,451, filed Aug. 16, 1990 now U.S. Pat. No. 5,242,541.

BACKGROUND OF THE INVENTION

1. Field of the invention

The present invention relates to a method of micromechanically producing ultrafine silicon tips on a silicon base for the AFM/STM profilometry, e.g. of deep trenches in future semiconductor technology.

2. Description of the Prior Art

The scanning tunneling microscope (hereafter abbreviated STM) has stimulated the development of new techniques for microcharacterization of materials which are based on the use of a very fine tip. One of these techniques involves the atomic force microscope (hereafter abbreviated AFM) which has recently demonstrated the capability to profile and image conductors and insulators.

In the initial design of the AFM (Binnig G, Quate CF, Gerber Ch, (1986) Atomic Force Microscope, Phys. Rev. Lett. 56, 930-933 and EP-A-0 223 918) a sensor consisting of a spring-like cantilever which is rigidly mounted at one end and carries at its free end a dielectric tip profiles the surface of an object. The force between the object's surface and the tip deflects the cantilever, and this deflection can be accurately measured, for example by a second tip which is part of an STM. A lateral spatial resolution of 3 nm has initially been achieved.

Another version of the AFM includes optical detection instead of an STM detection. In this version a tungsten tip at the end of a wire is mounted on a piezoelectric transducer. The transducer vibrates the tip at the resonance frequency of the wire which acts as a cantilever, and a laser heterodyne interferometer accurately measures the amplitude of the a. c. vibration. The gradient of the force between the tip and sample modifies the compliance of the lever, hence inducing a change in vibration amplitude due to the shift of the lever resonance. Knowing the lever characteristics, one can measure the vibration amplitude as a function of the tip-sample spacing in order to deduce the gradient of the force, and thus, the force itself (Duerig UT, Gimzewski JK, Pohl DW (1986) Experimental Observation of Forces Acting During Scanning Tunneling Microscopy, Phys. Rev. Lett. 57, 2403-2406; and Martin Y, Williams CC, Wickramasinghe HK (1987) Atomic Force Microscope-Force Mapping and Profiling on a sub 100-Å Scale, J. Appl. Phys. 61(10), 4723-4729).

In the normal deflection mode of the cantilever beam, forces on the order of $10^{-13}$ N can be detected. The sensitivity of the sensor head can be further enhanced by vibrating the object to be investigated at the resonance frequency fo of the cantilever beam, as described by G. Binnig et al in Phys. Rev. Lett. 56 (1986), pp. 930-933.

A most critical component in the AFM is the spring-like cantilever. As maximum deflection for a given force is needed, the cantilever should be of optimum softness. Therefore, a cantilever beam with the inherent high sensitivity should have a minimum spring constant.

In practice, for detecting positional changes on the order of $<0.1$ nm, the spring constant C of the cantilever should be in the range from about 0.001 to 1 N/m. At the same time a stiff cantilever with a high eigenfrequency is necessary in order to minimize the sensitivity to vibrational noise from the building. Usually, ambient vibrations, mainly building vibrations, are of the order of $<100$ Hertz. If the cantilever is chosen such that it has an eigenfrequency $f_o \geq 10$ kHz, the ambient vibrations will be attenuated to a negligible value.

For meeting both requirements, dimensions of the cantilever beam are necessary that one can only be obtained by microfabrication techniques.

Dimensions of an $SiO_2$ cantilever beam compatible with $C=0.034$ N/m, and $f_0^2=21.1$ kHz are for example: $1=250$ $\mu$m, $w=9$ $\mu m^o$, and $t=1.6$ $\mu$m. A process for making cantilevers with these dimensions is described inter alia in J. Vac. Sci. Technol. A 6(2), March/April 1988, pp. 271-274, by Albrecht, TR and Quate, CF, Atomic Resolution with the Atomic Force Microscope on Conductors and Nonconductors.

On the ends of such microcantilevers sharp tips have to be formed for profiling of the surface of an object. Should the structures to be profiled have a macroscopic depth exceeding for example 50 nm, the shape and the cross-section of the tip is decisive for the reproduction fidelity of the structure.

SUMMARY OF THE INVENTION

The invention provides an apparatus and method for the fabrication of tips which are shaped such as to allow the profiling of 3-dimensional structures.

BRIEF DESCRIPTION OF THE DRAWING

The invention will be described by way of example with respect to the accompanying drawings in which.

DESCRIPTION OF THE PREFERRED EMBODIMENTS

Figure 1A:
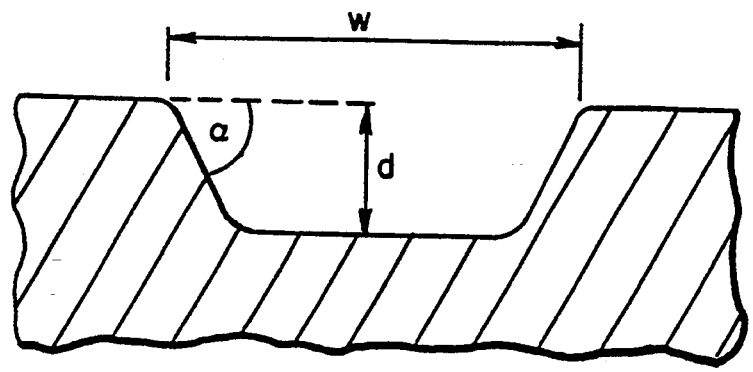
FIGS. 1A and 1B represent cross-section views of the shape of deep structures to be profiled.
Figure 1B:
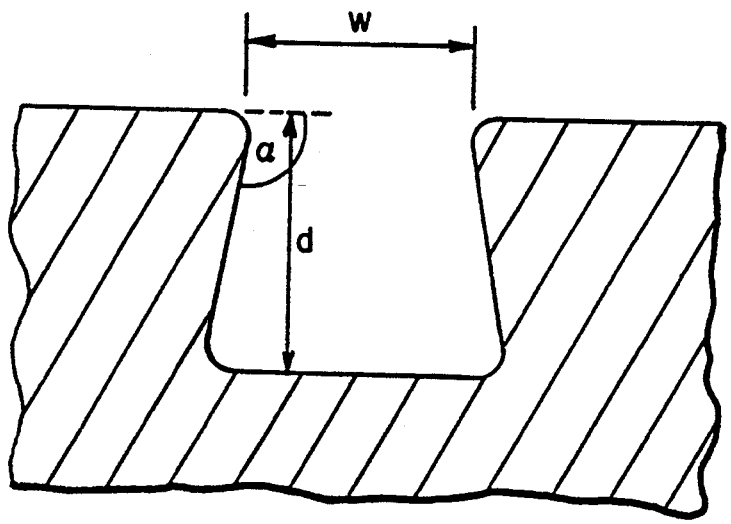

In the field of micro-profilometry profiling of 3-dimensional structures, such as trenches, and line-width measurements become more and more important. The accuracy of line-width measurement, and the requirements for profiling trenches are essentially determined by the angle of slope and the depth of the structures to be tested. In FIGS. 1A and 1B, two types of structures to be tested are shown. FIG. 1A shows a structure with a width w, a depth d, and an angle of the slope $\alpha<90°$ (positive slope); and FIG. 1B shows a structure with a width w, a depth d, and an angle of the slope $\alpha>90°$ (negative slope).

For a high resolution (i.e. for true-to-scale reproduction) special requirements have to be met with respect to the AFM tip/object structure ratio. Assuming the substrate structure of FIG. 1B has a width w of about 1 $\mu$m, it is obvious that the shaft of the tip must have a diameter of noticeably less than 1 $\mu$m.

Typical structure depths, in a silicon memory chip for example, are several $\mu$m. For profiling these structures the tip must be at least as long as the structures are deep. A storage capacitor for example has a width of about 0.7 μm and a depth of about 6 μm with the consequence that the length of a tip for profiling trenches of these dimensions is a multiple of its diameter. At the same time, the tip should have a high mechanical stability which can be influenced by the material itself, by the geometrical dimensions of the tip, and in particular by the type of fixing within a holding means. The AFM, described in the aforementioned Martin et al publication in the Journal of Applied Physics is frequently used in a dynamic mode, i.e., the tip is subject to high-frequency oscillations (in the kHz range), which also necessitates a high degree of stability as mechanical contact between the tip and the substrate would invariably destroy the tip.

According to the invention a silicon tip is suggested which is suitably monolithically fixed to a silicon carrier. For the profiling of 3-dimensional structures the silicon tip should have a high aspect ratio, i.e. a length to diameter ratio which is noticeably in excess of 1. Experimental experiences and theoretical thought have shown that there is no ideal tip for all types of applications. As already described above with respect to FIGS. 1A and 1B, the requirements to be observed for an ideal tip with regard to its diameter and total length are essentially determined by the depth and the angle of the slope of the structure to be profiled. Four different basic types of tip cross-sections are proposed, by which structures occurring in practice can best be profiled.

Figure 2A:
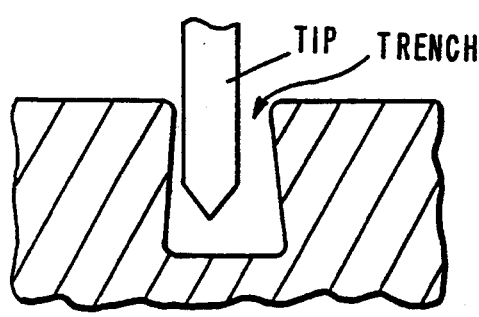
FIGS. 2A-2D are cross-section views of the shapes of four tips.

The tip shape shown in FIG. 2A is the ideal one for profiling structures having a small angle of slope $\alpha$, i.e. $\alpha < 45$ ($\alpha$ should be smaller than the angle at the end of the tip). Such tips have the advantage that they permit easy interpretation of image information by the AFM/STM-method, as physically there is only one sensing point at the very end of the tip. Their disadvantage is that they can only be used for structures with a small angle of slope.

Figure 2B:
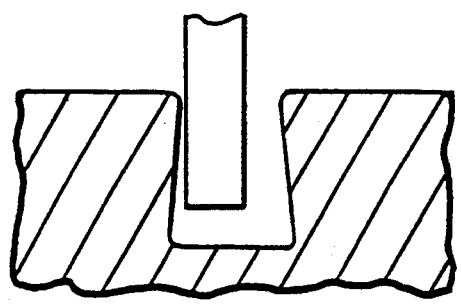

The tip shape of FIG. 2B is the ideal one for the profiling of structures with an angle of slope of close to 90°, which is still a positive angle. For the deep trenches of the aforementioned storage capacitor, angles of slope of about 87° are required. For the profiling of these structures the tip of FIG. 2B which has an ideal rectangular cross-section is most advantageous. The disadvantage is that on horizontal structure surfaces, the information may no longer be clearly available and therefore may have to be decoded. Its fabrication method which is an initial step to the fabrication of the tip of FIG. 2A, and which belongs to the subject matter of this invention will be described below.

Figure 2C:
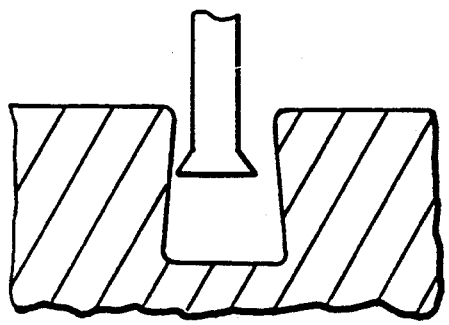

The tip shape of FIG. 2C is ideal for substantially vertical angles of slope or those with a slightly undercut profile (see FIG. 1B). Its fabrication method also belongs to the subject matter of this invention and will be described below. The advantage of the tip shape in accordance with FIG. 2C over the tip shape in accordance with FIG. 2B is evident. The disadvantage of 2C over 2B is only apparent in structures which are both, extremely narrow (<0.5 μm) and deep. For scanning a narrow trench, the leading diameter of the tip must be smaller than the trench width. On the other hand, the shaft diameter of the tip is decisive for the spring constant. It was found out by experiment that the tips should have a spring constant >2 N/m to prevent them from getting stuck on surfaces. When comparing tips shown in FIGS. 2B and 2C with each other, it is apparent that with the same leading diameter, the shaft of tip 2C is thinner and thus more resilient. As the spring constant for a rectangular beam is $$C \sim \frac{w \cdot t^3}{l^3}$$

and in order to ensure the same minimum stiffness between the tips shown in FIGS. 2B and 2C, the tip shown in FIG. 2C must be made shorter, which means that the maximum structure depth that can be measured with the tip shown in FIG. 2C is less than that which can be measured with the tip shown in FIG. 2B. In a practical example a tip with a length of 3 μm and a diameter of 0.2 μm, and having a spring constant C of 2.8 N/m and an eigenfrequency fo of 32 MHz, can be used for the profiling of structures that are <3 μm deep and >0.3 μm wide.

Figure 2D:
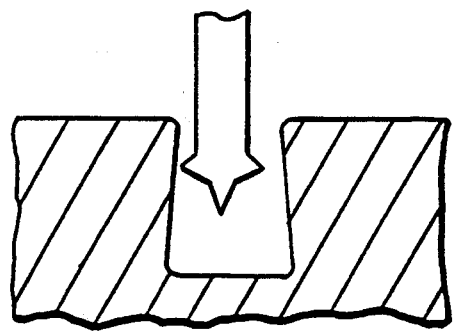

The same considerations take place with respect to the tip shown in FIG. 2D. For profiling horizontal surfaces, the tip shown in FIG. 2D has advantages over the tip shown in FIG. 2C. The process for the fabrication of the tip shown in FIG. 2D is described in European Patent Application 89115099.7, filed 16 Aug., 1989, J. W Bartha et al, inventors.

Figure 3A:
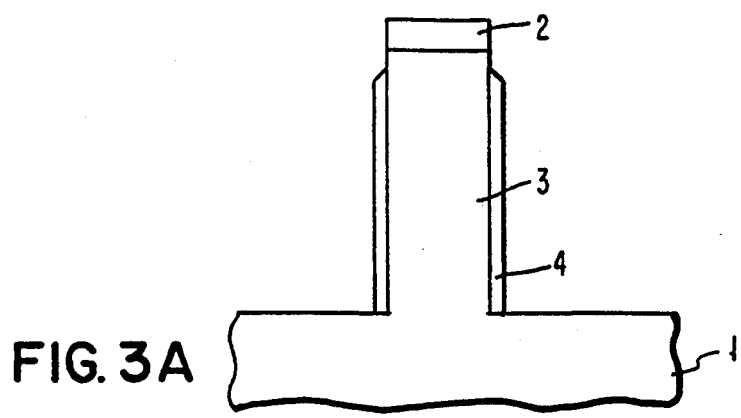
FIGS. 3A-3D show a process sequence by way of cross-section views for making the tips in accordance with the invention.

FIGS. 3A, B, C and D are schematics of the tip fabrication process in accordance with the invention. The starting material is a Si wafer (1) coated with about 1 μm thick silicon dioxide layer (2) with the orientation and doping of the silicon wafer being arbitrarily selectable. By means of standard photolithography, the future tip is masked (not shown). For this purpose a photoresist layer about 3 μm thick is applied to the silicon dioxide layer, and the desired mask pattern is defined in said photoresist layer. Typically, a circular mask is used, the diameter of which can be a multiple of the future shaft diameter of the tip.

The resist pattern is transferred into the silicon dioxide layer (2) in a first reactive ion etching (RIE) step using, e.g., CF4 as etch gas. The process parameters for this etching step are:

| planar RIE tool | |
|---|---|
| flow rate: | 20 sccm CF$_4$ |
| pressure: | 10 μbar |
| RF: | 800 V |
| DC: | 520 V |
| etch rate SiO$_2$: | 20 nm/min. |

Then, the silicon dioxide mask (2) is transferred deep into the silicon (1) in an anisotropic RIE step (FIG. 3A). The etch depth essentially determines the length of the future tip (3). The process parameters for this etching step are:

| flow: | 50 sccm Ar + 5 sccm Cl$_2$ |
|---|---|
| pressure: | 20 μbar |
| RF: | 600 V |
| DC: | 150 V |
| etch rate Si: | 67 nm/min. |

The side walls of the structure (3) are covered with what is known as a side wall redeposition layer (4), a phenomenon typical of highly anisotropic RIE processes. This side wall layer must be removed before continuing the process. This step is an isotropic wet etching step using the following etch solution:
35.5 Vol % HNO$_3$ 21.5 Vol % CH₃COOH
21.5 Vol % HF
21.5 Vol % H₂O
FC 98 wetting agent* (trademark Fluorad of the 3 M Company) at T=20° C.
etch rate Si 2.5 m/min.

Figure 3B:
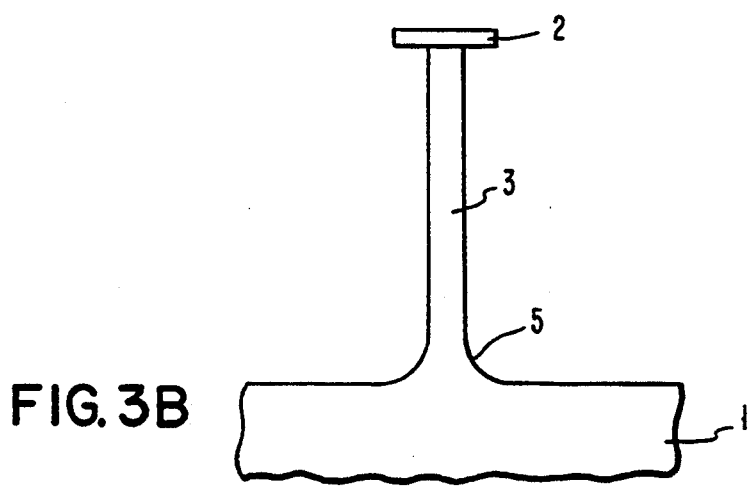

During this etching step the side wall redeposition layer (4) is removed. This is followed by thin etching the silicon shaft (3) in the same solution (say to a final diameter of about 0.2 μm). Concurrently, this being an isotropic etch step, the conically shaped base (5) of the shaft (3) is produced which improves the mechanical stability of the tip shaft (FIG. 3B). It is essential in this context that the silicon dioxide mask (2) is still intact which ensures that the tip is neither shortened nor rounded in the described step.

By buffered hydrogen fluoride dip-etching, the silicon dioxide mask (2) is removed. The resulting tip (see FIG. 2B) has a rectangular cross-section.

Figure 3C:
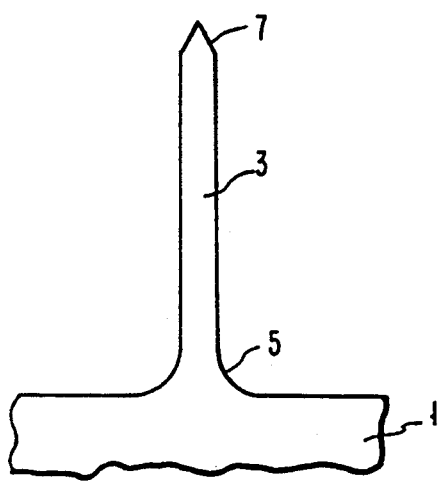

In the next process step, the tip (7) is pointed in a maskless argon ion etch step, utilizing the effect that for the combination argon gas and silicon substrate the etch rate is angle-dependent. For angles of about 60°, the etch rate exceeds that available for perpendicular bombardment (0°) by roughly a factor 3. The process parameters for the pointing of the tip (FIG. 3C) are:

| | |
|---|---|
| flow: | 20 sccm Ar |
| pressure: | 3 μbar (important) |
| RF: | 1000 V |
| DC: | 630 V |
| vertical silicon etch rate: | 4 nm/min. |

Figure 3D:
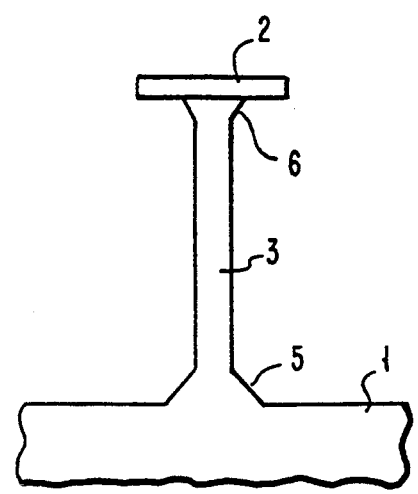

If, following FIG. 3B and assuming an intact silicon dioxide mask (2), an anisotropic wet etch step is used (e.g. an aqueous 37.5 wt % KOH solution), a negative profile (6) is formed directly below the mask (2) (FIG. 3D). The final tip shape (see FIG. 2C) is obtained after removal of the oxide mask with buffered hydrofluoric acid.

With the method of the invention, ultrafine tips with great mechanical stability can be made. The tips which have a high aspect ratio (up to 1:20) can be used in an AFM for the profiling of deep trenches in future semiconductor technology.

While the invention has been described with respect to selected embodiments thereof, it will be apparent to those skilled in the art that variations can be made thereto without departing from the spirit and scope of the present invention.

Having thus described our invention, what we claim as new and desire to secure by Letters Patents is:

1. An ultrafine tip for AFM/STM profilometry of trenches having sidewalls, comprising:
   a shaft portion having a length sufficient for said ultrafine tip to reach into a trench to be profiled; and
   a tip portion at the end of said shaft portion and integral therewith;
   said tip portion including a region of increasing cross-section forming a circumferential edge protruding from said shaft portion for approaching an undercut trench sidewall without having said shaft portion approach said undercut sidewall more closely.

2. An ultrafine tip as defined in claim 1 wherein said shaft portion has an approximately constant cross-section.

3. An ultrafine tip as defined in claim 2 wherein said shaft portion has an approximately circular cross-section.

4. An ultrafine tip as defined in claim 1 wherein said shaft portion defines an axis and said circumferential edge extends around said axis at a radius substantially greater than any radius of said shaft portion.

5. An ultrafine tip as defined in claim 4 wherein said radius of said circumferential edge is approximately constant.

6. An ultrafine tip as defined in claim 1 wherein said ultrafine tip terminates at said tip portion with a point.

7. An ultrafine tip as defined in claim 6 wherein said shaft portion defines an axis and said point is approximately aligned with said axis.

8. An ultrafine tip as defined in claim 1 wherein said shaft portion defines an axis and said ultrafine tip terminates at said tip portion with an approximately flat surface that is approximately perpendicular to said axis.

9. An ultrafine tip as defined in claim 8 wherein said flat surface has a perimeter and said perimeter and circumferential edge are substantially coincident.

10. An ultrafine tip as defined in claim 1 and further comprising a base portion at an end of said shaft portion opposite to said tip portion and integral with said shaft portion.

11. An ultrafine tip as defined in claim 1 wherein said shaft portion and said tip portion are formed of silicon.

12. An ultrafine tip for AFM/STM profilometry of trenches having sidewalls, comprising:
   a shaft portion having a length sufficient for an end of said ultrafine tip to reach into a trench to be profiled; and
   a protrusion at said end of said ultrafine tip forming a circumferential working edge surrounding and protruding away from said shaft portion so as to approach an undercut trench sidewall without having said shaft portion approach said undercut sidewall more closely than the protrusion.

13. An ultrafine tip for AFM/STM profilometry of trenches having sidewalls, comprising:
   a shaft having a length sufficient for an end of said ultrafine tip to reach into a trench to be profiled;
   said shaft having a flared tip portion forming a circumferential working edge surrounding and protruding away from said shaft for approaching an undercut trench sidewall more closely than any other portions of said shaft.

* * * * *